C. D. JEFFRIES.
Harvester Dropper.
No. 99,444. Patented Feb. 1, 1870.
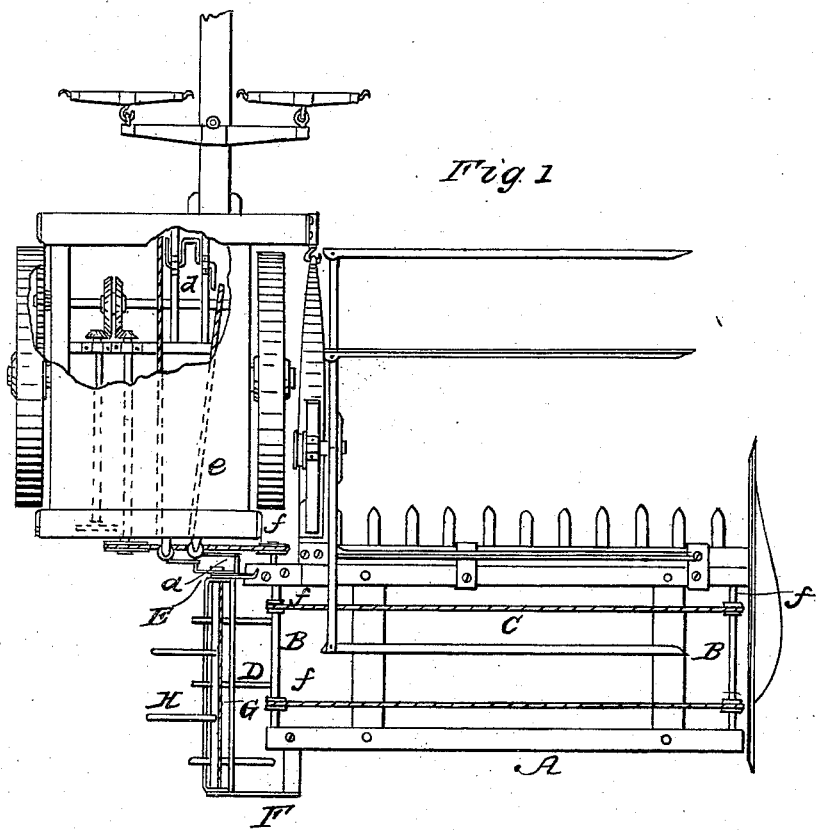
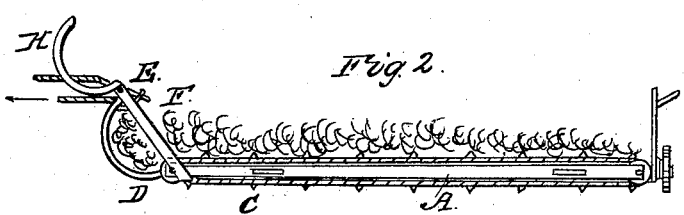
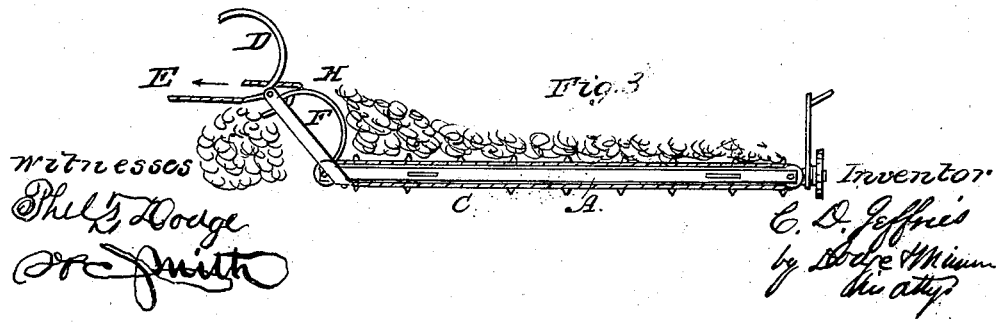

United States Patent Office.

CYRENEUS D. JEFFRIES, OF WOOSTER, OHIO.

IMPROVEMENT IN HARVESTER-DROPPERS.

Specification forming part of Letters Patent No. 99,444, dated February 1, 1870.

*To all whom it may concern:*

Be it known that I, CYRENEUS D. JEFFRIES, of Wooster, in the county of Wayne and State of Ohio, have invented certain new and useful Improvements for Discharging Reaped Grain from the Platform of Ordinary Grain Reapers or Harvesters; and I do declare that the following is a full, clear, and exact description thereof, reference being had to the accompanying drawings, making part of this specification, and to the letters of reference marked thereon, like letters indicating like parts wherever they occur.

My invention relates to harvesters; and it consists in the construction of a novel device for dropping or discharging the reaped grain from the platform in quantities of the requisite amount for a sheaf and ready for binding.

In the drawings, Figure 1 is a top plan view of an ordinary reaper with my device attached. Figs. 2 and 3 are views from the rear, showing my dropping device in different positions.

In constructing my device I connect rigidly to the inner end of the platform A of a reaper two supports, F, one on each side, as clearly shown in Fig. 1, and mount in these supports a shaft, G, provided with two series of semicircular arms, D and H, curved in opposite directions, and arranged as shown in Figs. 1, 2, and 3. The inner end of the shaft G, I provide with a double arm, crank, or lever, E, and connect it by cords e to a treadle, d, or in any other manner that will allow the driver to conveniently operate the shaft G with its arms.

At each end of the platform I place rollers B in suitable journals, and provide them with grooved wheels f, rigidly attached for carrying endless cords or chains C, or an endless apron, the inner end of the inner roller being provided with a grooved wheel, g, for connecting it with the operating parts of the reaper, as clearly shown in Fig. 1.

In operating my device I first adjust a guard, a, extending on each side of the shaft G, so as to limit the movements of the arms D and H, as clearly shown in all the figures, and place the arms D as shown in Fig. 2. As the reaper cuts the grain it falls upon the cords or endless apron C, and is carried along and delivered into the arms D. As soon as the arms are sufficiently filled with enough grain to form a bundle, I suddenly turn the shaft G by means of the double crank E, which I operate by the treadle d through the cords e, or in any other suitable manner. As the shaft is turned the grain in the arms D is dropped in a suitable shape and quantity for binding, and the arms H come immediately into the position shown in Fig. 3, and prevent the grain from being carried off the platform until the arms D can be swung round again ready to receive it. In this way by alternately swinging the arms I am able to drop the grain as fast as it accumulates in the arms D in sufficient quantities to form a bundle.

It is evident that this dropper may be readily adapted to any of the ordinary reapers at very little expense, and by this means their utility be greatly enhanced.

Having thus described my invention, what I claim is—

A dropping device for harvesters, consisting of two series of curved arms, D and H, attached to an oscillating shaft, G, when constructed and arranged to be operated as herein shown and described, so that one series, D, may receive and drop the grain, and while dropping it that the other may stop the grain on the apron from leaving it, as set forth.

CYRENEUS D. JEFFRIES.

Witnesses:
N. V. JEFFRIES,
JNO. H. McCUTCHEN.